United States Patent
Olberding

(10) Patent No.: US 7,712,723 B2
(45) Date of Patent: *May 11, 2010

(54) LEVER POSITIONING DEVICE FOR VALVE ACTUATOR

(75) Inventor: Jason G. Olberding, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 569 days.

This patent is subject to a terminal disclaimer.

(21) Appl. No.: 11/468,581

(22) Filed: Aug. 30, 2006

(65) Prior Publication Data

US 2008/0054214 A1 Mar. 6, 2008

(51) Int. Cl.
*F16K 31/12* (2006.01)
(52) U.S. Cl. .......................................... 251/58; 251/62
(58) Field of Classification Search .................. 251/58, 251/62, 231, 236, 242; 74/102, 104
See application file for complete search history.

(56) References Cited

U.S. PATENT DOCUMENTS

| | | | | |
|---|---|---|---|---|
| 2,159,979 A | * | 5/1939 | Parsons | 137/522 |
| 2,683,992 A | * | 7/1954 | Price | 74/110 |
| 2,928,584 A | * | 3/1960 | Foster | 417/341 |
| 2,984,116 A | * | 5/1961 | Johnson | 74/104 |
| 3,146,681 A | * | 9/1964 | Sheesley | 92/13.5 |
| 3,152,520 A | * | 10/1964 | Heese | 92/52 |
| 3,222,884 A | * | 12/1965 | Lyle | 403/356 |
| 3,486,389 A | * | 12/1969 | Cripe et al. | 74/102 |
| 3,570,373 A | * | 3/1971 | Tupker | 92/138 |
| 3,614,913 A | * | 10/1971 | Clark | 92/138 |
| 3,672,260 A | * | 6/1972 | Gachot et al. | 92/69 R |
| 3,672,262 A | * | 6/1972 | Karr | 92/140 |
| 3,709,106 A | * | 1/1973 | Shafer | 92/138 |
| 3,828,808 A | * | 8/1974 | Ortelli | 137/340 |
| 3,963,211 A | * | 6/1976 | Myers | 251/85 |
| 3,985,151 A | * | 10/1976 | Smith | 137/269 |
| 4,100,816 A | * | 7/1978 | Clark | 74/89.14 |
| 4,261,546 A | * | 4/1981 | Cory et al. | 251/58 |
| 4,355,566 A | * | 10/1982 | Kaji | 92/136 |
| 4,545,846 A | * | 10/1985 | Lillibridge et al. | 156/578 |
| 4,558,605 A | * | 12/1985 | Tanner | 74/102 |
| 4,882,977 A | * | 11/1989 | Himeno et al. | 92/5 R |

(Continued)

FOREIGN PATENT DOCUMENTS

DE 699 16 445 4/2005

(Continued)

OTHER PUBLICATIONS

International Search Report for PCT/US2007/014515, dated Dec. 21, 2007.

(Continued)

*Primary Examiner*—John K Fristoe, Jr.
*Assistant Examiner*—Marina Tietjen
(74) *Attorney, Agent, or Firm*—Marshall, Gerstein & Borun LLP

(57) ABSTRACT

A valve actuator comprises a housing, a lever, and a positioning device. The lever is disposed within the housing and is adapted to be operatively coupled to rotate the valve shaft The positioning device is operatively coupled to the lever to bias the lever into a predetermined position

20 Claims, 6 Drawing Sheets

U.S. PATENT DOCUMENTS

| | | | |
|---|---|---|---|
| 5,507,467 A | | 4/1996 | Mott |
| 6,076,799 A | * | 6/2000 | Baumann ..................... 251/62 |
| 6,640,688 B1 | * | 11/2003 | Harper ......................... 92/23 |
| 2005/0274416 A1 | | 12/2005 | Engle et al. |

FOREIGN PATENT DOCUMENTS

| | | |
|---|---|---|
| FR | 1 446 153 | 6/1966 |
| GB | 898892 | 6/1962 |
| GB | 2 174 787 A | 11/1986 |
| WO | WO 99/42753 | 8/1999 |

OTHER PUBLICATIONS

Written Opinion of the International Searching Authority for PCT/US2007/014515, dated Dec. 21, 2007.

McMaster-Carr Supply Company, Wave Disc Spring, Part No. 9714K33, dated May 2001.

McMaster-Carr Supply Company, High-Carbon Steel Finger Disc Spring, Part No. 9717K64, dated May 2001.

McMaster-Carr Supply Company, Grade 1074 Hi-Crbn Steel Curved Disc Spring, Part No. 9715K85, dated May 2001.

Office Action for Canadian Patent Application No. 2,662,047, dated Oct. 6, 2009.

* cited by examiner

LEVER POSITIONING DEVICE FOR VALVE ACTUATOR

FIELD OF THE DISCLOSURE

The present disclosure relates to a valve actuator and, more particularly, a lever positioning device for a valve actuator.

BACKGROUND

FIG. 1 depicts one typical rotary valve actuator 100. The rotary valve actuator 100 generally includes a housing 102 and a drive assembly 104. A portion of the housing 102 is removed, thereby exposing the drive assembly 104, which is partly broken away for purposes of description, The housing 102 includes a generally cylindrical body portion 106 and a pair of opposing cover plates 108a, 108b. The drive assembly 104 includes a diaphragm subassembly 110, shown in cross-section, and a lever subassembly 112. The diaphragm subassembly 110 generally includes an upper housing 114 containing a diaphragm 116, a diaphragm rod 118, and a pair of springs 119. The springs 119 bias the diaphragm 116 into the position depicted. The diaphragm 116 is operably coupled to the diaphragm rod 118 to displace the diaphragm rod 118 against the springs 119 in response to a pressure change in the upper housing 114. The diaphragm rod 118, in turn, actuates the drive assembly 104.

The drive assembly 104 includes a lever 122, a collet 124, and a draw nut 125. The lever 122 includes a body portion 126 and a yoke portion 128. The yoke portion 128 operatively couples the lever 122 to the diaphragm rod 118. The body portion 126 includes a bore 127 defined, at least partly, by a generally cylindrical central portion 126a and a generally frustoconical receiver portion 126b.

The collet 124 is a generally rod-shaped member disposed within the bore 127 of the body portion 126 of the lever 122 and is adapted for axial displacement relative to the lever 122. The collet 124 includes a plurality of collet fingers 134 and a threaded portion 136. The draw nut 125 threadably engages the threaded portion 136 to secure the collet 124 within the lever 122. The collet fingers 134 have outer surfaces 134a shaped and configured to slidably engage the receiver portion 126b of the lever 122 and inner surfaces 134b shaped and configured to engage a rotary valve shaft 138, which is disposed between the collet fingers 134.

Thus, during assembly, the draw nut 125 is tightened on the threaded portion 136 of the collet 124, thereby drawing the collet 124 to the left relative to the orientation of the actuator 100 depicted in FIG. 1. This causes the collet 124 to slidably displace relative to the body portion 126 of the lever 122. Simultaneously, sliding engagement between the receiver portion 126b and the outer surfaces 134a of the collet fingers 134 causes the collet fingers 134 to displace radially inwardly, thereby wedging between the receiver portion 126b and the valve shaft 138. Continued tightening of the draw nut 125 further displaces the collet 124 to further wedge the collet fingers 134 and secure the assembly 104 to the valve shaft 138.

While the above-described configuration may effectively couple such rotary valve shafts 138 to such actuators 100, they are vulnerable to certain inefficiencies. For example, overdrawing the collet 124 can displace the collet 124 away from the valve shaft 138. This displacement can generate tension on the valve shaft 138. Tension applied to the valve shaft 138 may lead to an offsetting of the valve control element (not shown), which may include, for example, a butterfly valve control element, thereby affecting the quality, life expectancy, or leakage of any seal created thereby. Furthermore, overdrawing the collet 124 can displace the lever 122 toward the valve shaft 138 and into engagement with the housing 102, thereby leading to metal to metal contact, which generates friction and affects the performance of the actuator 100.

SUMMARY

According to one aspect of the present disclosure, a valve actuator is provided for being coupled to a valve shaft. The valve actuator includes a housings a lever, and a positioning device. The lever is disposed within the housing and is adapted to be operatively coupled to rotate the valve shaft. The positioning device is operatively coupled to the lever and adapted to bias the lever into a predetermined position.

According to another aspect, the positioning device is disposed between a portion of the lever and the housing.

According to another aspect, the positioning device comprises at least one spring disposed adjacent the lever to bias the lever away from a portion of the housing.

According to another aspect, the lever comprises an elongated member having a first end rotatably supported by a first portion of the housing and a second end rotatably supported by a second portion of the housing According to another aspect, the positioning device comprises a first spring and a second spring. The first spring is disposed adjacent the first end of the lever and the second spring is disposed adjacent the second end of the lever. The first and second springs bias the lever toward a center of the housing.

According to another aspect, the actuator comprises a collet carried by the lever. The collet is adapted to couple the lever to the valve shaft. The collet displaces the lever in a first direction and the positioning device biases the lever in a second direction that is substantially opposite the first direction.

According to another aspect, the positioning device comprises a curved disk spring, a wave spring, or a finger disk spring,

DETAILED DESCRIPTION

Figure 1:
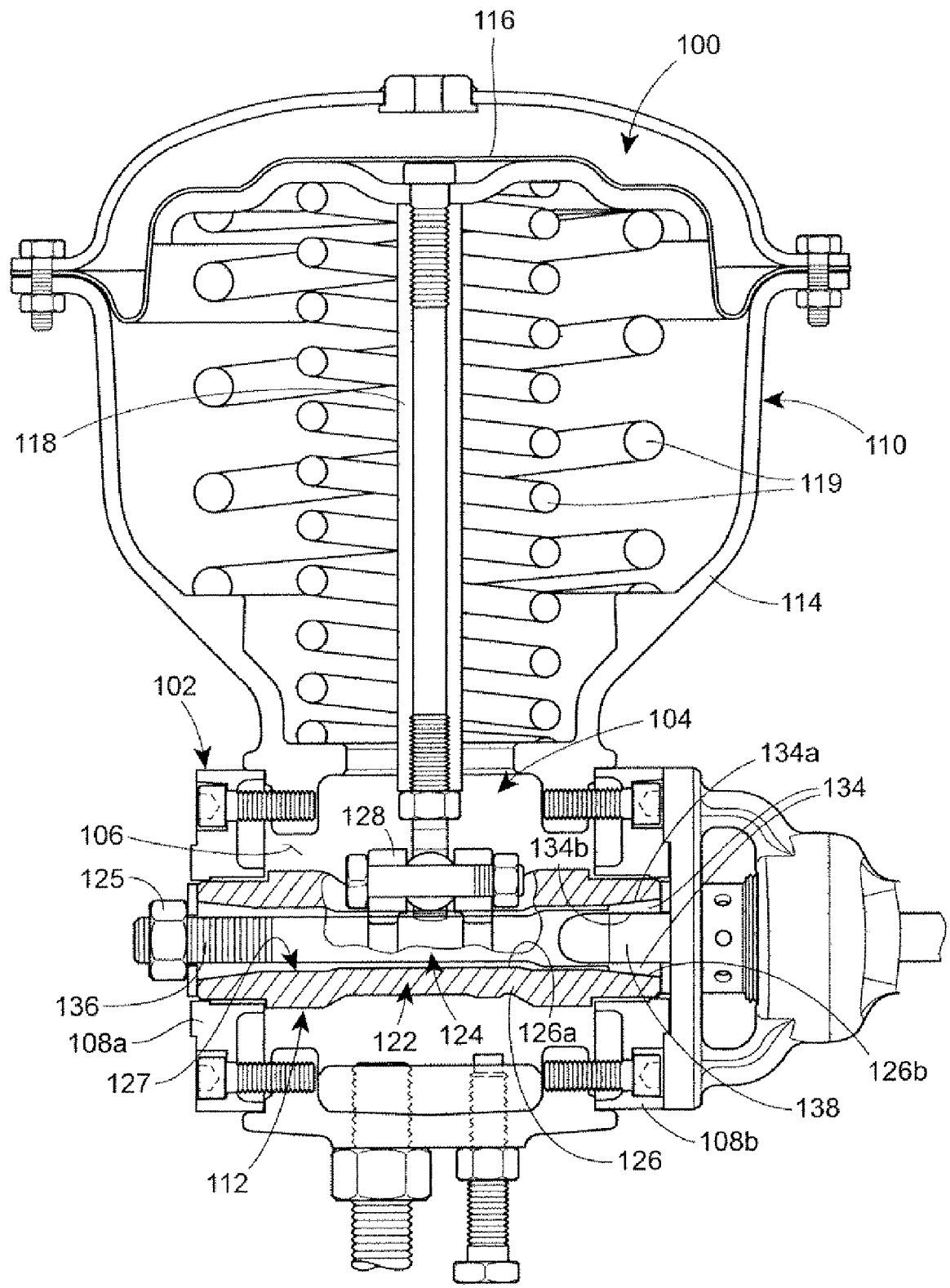
FIG. 1 is a cross-sectional, partially broken away side view of one conventional rotary valve actuator.
Figure 2:
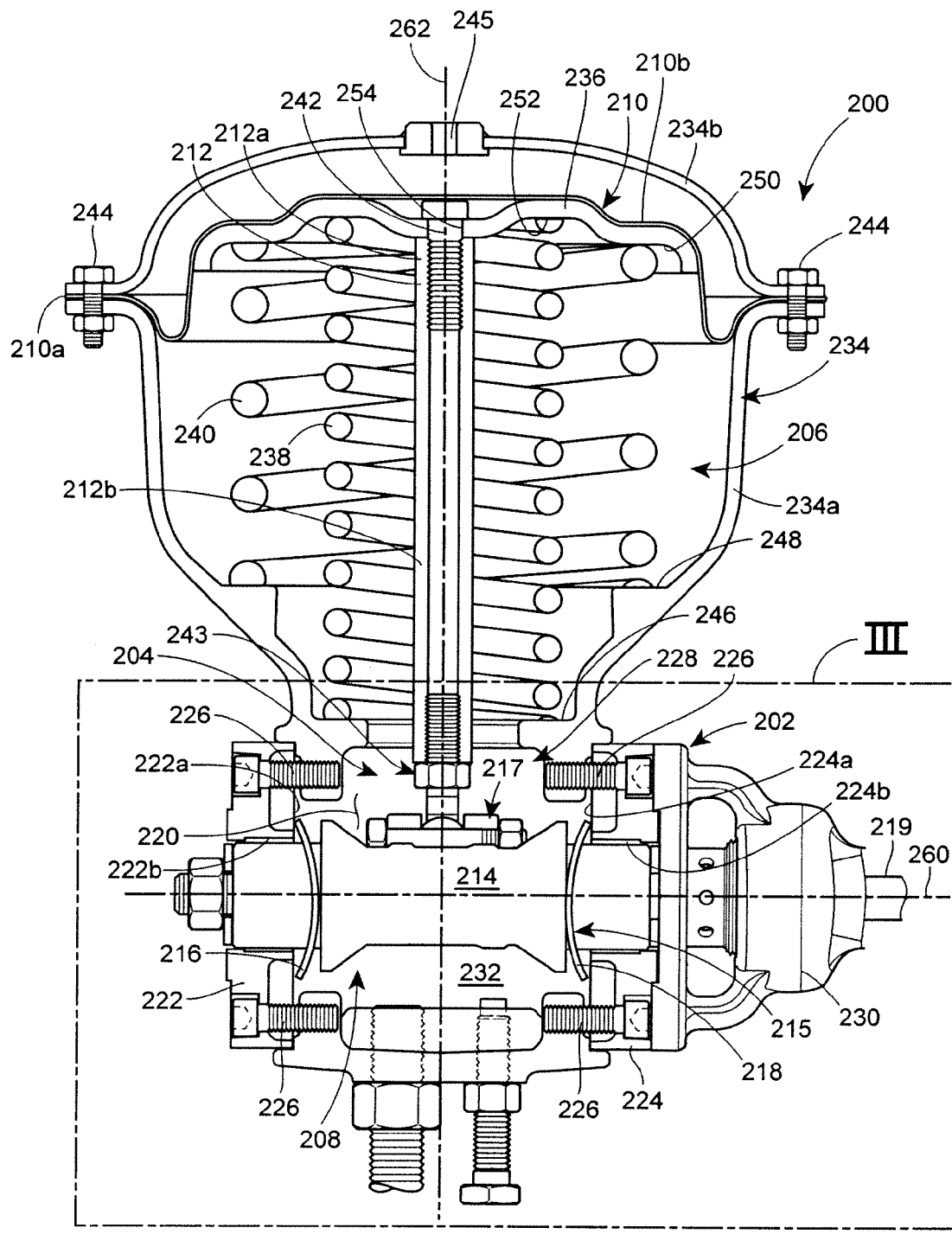
FIG. 2 is a partial cross-sectional side view of a rotary valve actuator including a pair of positioning devices constructed according to the principles of the present disclosure.

FIG. 2 depicts a rotary valve actuator 200 constructed in accordance with the principles of the present disclosure. The rotary valve actuator 200 generally includes a housings 202 and a drive assembly 204. The drive assembly 204 of the depicted embodiment includes a diaphragm subassembly 206 and a lever subassembly 208. The diaphragm subassembly 206 generally includes a diaphragm 210 operatively coupled to a diaphragm rod 212 for actuating the lever subassembly 208. The lever subassembly 208 includes a lever 214, and a positioning device assembly 215. In the example of the FIG. 2, the positioning device assembly 215 comprises a first positioning device 216 and a second positioning device 218. The diaphragm rod 212 is operatively coupled to the lever 214 and adapted to drive a rotary valve shaft 219 of a rotary valve (not shown). During assembly, the first and second positioning devices 216, 218 bias the lever 214 toward a predetermined position within tie housing 202, thereby ensuring that the lever 214 can rotate as desired in response to displacement of the diaphragm rod 212.

With reference to FIG. 2, the housing 202 of the actuator 200 of the present embodiment includes a generally cylindrical body 220, a first cover plate 222, a second cover plate 224, and a plurality of threaded fasteners 226. The cylindrical body 220 defines an opening 228 through a side thereof. The first cover plate 222 includes a generally flat plate having an inner surface 222a and defining a cylindrical bore 222b. The second cover plate 224 similarly includes a generally flat plate having an inner surface 224a and defining a cylindrical bore 224b. Additionally, the second cover plate 224 is adapted to receive a mounting yoke 230 of the rotary control valve (shown in partial cross-section). The mounting yoke 230 is integral to the rotary valve and is adapted to receive the rotary valve shaft 219 and mount the valve actuator 200 to the rotary valve with threaded fasteners (not shown) or any other suitable attachment means known to those skilled in the art. Additionally, the threaded fasteners 226 secure the first and second cover plates 222, 224 to the cylindrical body 220, thereby defining a cavity 232 therein.

As stated above the drive subassembly 204 includes the diaphragm subassembly 206 and the lever subassembly 208. The diaphragm subassembly 206 is attached to the housing 202 via the opening 228 in the cylindrical body 220. The cavity 232 defined by the housing 202 contains the lever subassembly 208.

The diaphragm subassembly 206 generally includes the diaphragm 210 and the diaphragm rod 212. Additionally, the diaphragm subassembly 206 includes a housing 234, a diaphragm plate 236, a first compression spring 2318, a second compression spring 240, a threaded fastener 242, and a rod end-bearing 243. The housing 234 includes an upper housing 234a and a diaphragm casing 234b secured together by a plurality of cap screws 244. The diaphragm casing 234b defines an inlet port 245 adapted to be connected to a pressure source such as a pneumatic line. The upper housing 234a is generally cup-shaped and includes a lower shelf portion 246 and an upper shelf portion 248. The upper housing 234a contains a majority of the remainder of the diaphragm subassembly 206.

As mentioned above, the diaphragm 210 is operatively coupled to the diaphragm rod 212. More specifically, the diaphragm plate 236 couples the diaphragm 210 to the diaphragm rod 212. The diaphragm plate 236 is a contoured circular plate having an outer annual surface 250, an inner annular surface 252, and a central aperture 254. In the embodiment depicted in FIG. 2, the central aperture 254 is disposed in a countersunk central region of the diaphragm plate 236. The diaphragm rod 212 includes a hollow cylindrical rod having a first end 212a and a second end 212b. The threaded fastener 242 is disposed through the central aperture 254 in the diaphragm plate 236 and threadably attaches to the first end 212a of the diaphragm rod 212. This secures the diaphragm plate 236 to the diaphragm rod 212.

The diaphragm 210 includes a relatively flexible disk-shaped member having an outer disk portion 210a and an inner disk portion 210b. In one embodiment, the diaphragm 210 is constructed of a fabric. However, in alternate embodiments, the diaphragm 210 may be constructed of a polymer or any other material or combination of materials capable of serving, the principles of the present disclosure. The outer disk portion 210a is secured between the diaphragm casing 234b and the upper housing 234a. The inner disk portion 210b is disposed above the diaphragm plate 236 and may be secured to the diaphragm 210 in numerous ways known to one skilled in the art. In an alternative embodiment, the inner disk portion 210b of the diaphragm 210 is not secured to the diaphragm plate 236 at all, but rather, merely gravitationally engages the diaphragm plate 236.

The first and second compression springs 238, 240 are concentrically disposed around the diaphragm rod 212 and between the diaphragm plate 236 and the tipper housing 234a. In the depicted embodiment, the first compression spring 238 has a diameter that is smaller than a diameter of the second compression spring 240. The first compression spring 238 is axially disposed between the lower shelf portion 246 of the upper housing 234a and the inner annular surface 252 of the diaphragm plate 236. The second compression spring 240 is axially disposed between the upper shelf portion 248 of the upper housing 234a and the outer annular surface 250 of the diaphragm plate 236. Accordingly, the first and second compression springs 238, 240 bias the diaphragm plate 236, the diaphragm rod 212, and the diaphragm 210 into the position illustrated in FIG. 2.

During operation of the diaphragm subassembly 206, a pressure is introduced into the housing 234 via the inlet port 245. As the pressure increases between the diaphragm 210 and the diaphragm casing 234b, the pressure forces the diaphragm 210 and diaphragm plate 236 downward relative to the orientation of the actuator 200 depicted in FIG. 2. Accordingly, the diaphragm rod 212 displaces downward. Upon the release or removal of pressure from between the diaphragm casing 234b and the diaphragm 210, the first and second compression springs 238, 240 bias the diaphragm 210, diaphragm plate 236, and diaphragm rod 212 back to the position depicted in FIG. 2. The displacement of the diaphragm subassembly 206 is transferred to the lever subassembly 208 via the rod end-bearing 243, as will be described in further detail below.

Figure 3:
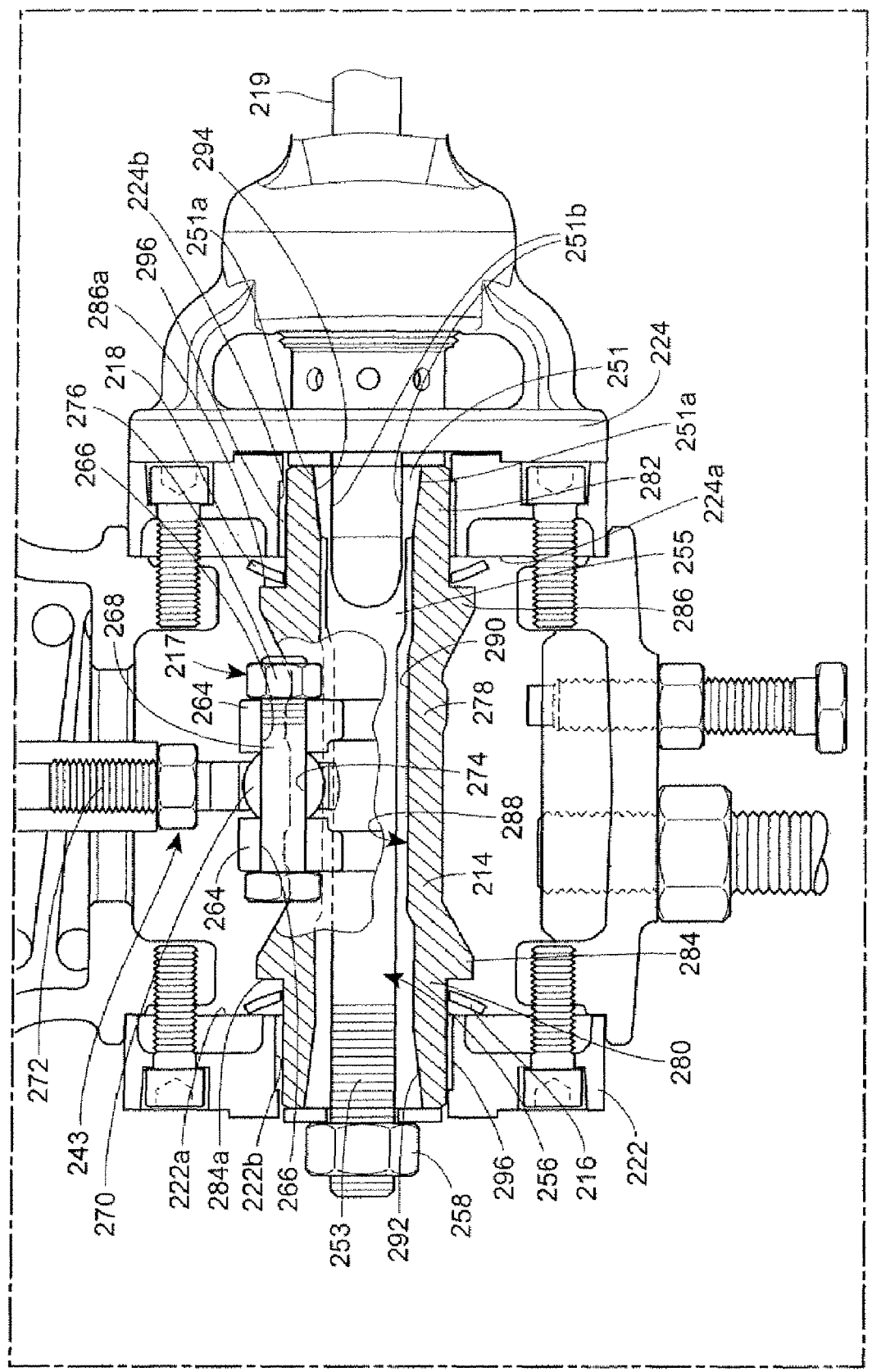
FIG. 3 is a cross-sectional, partially broken away detailed side view of a drive assembly of the actuator of FIG. 2 taken from box III of FIG. 2.

With reference to FIGS. 2 and 3, the lever subassembly 208 generally includes a lever 214, a lever yoke 217, the first and second positioning devices 216, 218, a collet 256 (shown in FIG. 3), and a draw nut 258 (shown in FIG. 3). The lever 214 includes an axis 260, which is substantially perpendicular to an axis 262 of the diaphragm rod 212. The lever yoke 217 is operatively attached to the diaphragm rod 212 via the rod end-bearing 243 to transfer linear displacement of the diaphragm rod 212 along axis 262 (shown in FIG. 2) into rotational displacement of the lever 214 about axis 260 (shown in FIG. 2).

More specifically, the lever yoke 217 includes a pair of flanges 264 that extend radially outward from the lever 214. The flanges 264 each include an aperture 266 receiving a bolt 268. The rod end-bearing 243 includes a spherical ball 270 and a threaded shaft 272. The threaded shaft 272 is threaded into the second end 212b of the diaphragm rod 212. The spherical ball 270 includes a cylindrical bore 274 therethrough. The cylindrical bore 274 receives the bolt 268 disposed through the apertures 266 in the flanges 264 of the lever yoke 217. A nut 276 is threaded onto an end of the bolt 268 thereby operatively securing the diaphragm rod 212 to the lever 214.

The lever 214 includes a generally hollow cylindrical member having a central body portion 278, a first end portion 280, a second end portion 282, a first collar portion 284, and a second collar portion 286. The first and second collar portions 284, 286 comprise generally annular collar portions extending radially outward from the central body potion 278. The first collar portion 284 is disposed adjacent the first end portion 280 and includes a first axial end surface 284a. The second collar portion 286 is disposed adjacent the second end portion 282 and includes a second axial end surface 286a. The axial end surfaces 284a, 286a are disposed generally parallel to the inner surfaces 222a, 224a of the cover plates 222, 224, respectively. The first axial end surface 284a faces the inner surface 222a of the first cover plate 222. The second axial end surface 286a faces the inner surface 224a of the second cover plate 224.

With continued reference to FIG. 3, the lever 214 defines a bore 288 including a generally cylindrical central portion 290, a generally frustoconical first receiver portion 292, and a generally frustoconical second receiver portion 294. The first receiver portion 292 is disposed at the first end portion 280 of the lever 214. The second receiver portion 294 is disposed at the second end portion 282 of the lever 214. Each of the first and second receiver portions 292, 294 axially coverage from the first and second end portions 280, 282, respectively, toward the central portion 290 of the bore 288, as depicted in FIG. 3, thereby defining generally frustoconical bore portions.

The lever 214 is disposed in the cavity 232 of the housing 202 such that the first end portion 280 is disposed for rotational displacement in the cylindrical bore 222b of the first cover plate 222 and the second end portion 282 is disposed for rotational displacement in the cylindrical bore 224b of the second cover plate 224. In the depicted embodiment of the actuator 200, the cylindrical bores 222b, 224b contain bushings 296 for minimizing any rotational friction between the lever 214 and the cover plates 222, 224.

As illustrated in FIGS. 2 and 3, the central body portion 278 of the lever 214 has a longitudinal dimension between the axial end surfaces 284a, 286a of the first and second collar portions 284, 286 that is less then a dimension between the inner surfaces 222a, 224a of the cover plates 222, 224 of the housing 202. Accordingly, the first positioning device 216 is disposed adjacent the first end portion 280 of the lever 214 between the first axial end surface 284a of the first collar portion 284 and the inner surface 222a of the first cover plate 222. Similarly, the second positioning device 218 is disposed adjacent the second end portion 282 of the lever 214 between the second axial end surface 286a of the second collar portion 286 and the inner surface 224a of the second cover plate 224. So configured, the lever 214 can move along axis 260 (shown in FIG. 2), if required. Thus, the first positioning device 216 applies a force against the lever 124 when engaged by the first axial end surface 284a of the first collar portion 284 and the second positioning device 218 applies a force against the lever 214 when engaged by the second axial end surface 286a of the second collar portion 286. Therefore, if required, the forces generated by each of the first and second positioning devices 216, 218 serve to center the lever 214 along axis 260 within the cavity 232 of the housing 202 during assembly and operation, as will he described in further detail below.

Referring specifically to FIG. 3, the collet 256 generally includes a rod shaped member having a plurality of resilient collet fingers 251, a threaded portion 253, and a shoulder 255. The collet 256 is slidably disposed within the bore 288 of the lever 214 such that the threaded portion 253 is located adjacent to and extends axially beyond the first end portion 280 of the lever 214. A diameter of the threaded portion 253 is less than a diameter of the central portion 290 and the first receiver portion 292 of the bore 288 in the lever 214. The draw nut 258 threadably engages the threaded portion 253 of the collet 256 and is adapted to tighten the collet 256 within the bore 288 to secure the rotary valve shaft 219 to the lever 214, as will be described below.

The collet fingers 251 are located adjacent to the second end portion 282 of the lever 214. The collet fingers 251 are circumferentially spaced and have outer surfaces 251a and inner surfaces 251b. The outer surfaces 251a are shaped and configured to slidably engage the second receiver portion 294 of the lever 214. More specifically, the outer surfaces 251a of the collet fingers 251 are generally shaped as partial frustoconical surfaces. Similar to the second receiver portion 294, the outer surfaces 251a of the collet fingers 251 radially converge from the second end portion 282 of the collet 256 toward the central portion 290 of the bore 288 in the lever 214. The inner surfaces 251b of the collet fingers 251 are shaped and configured to engage the rotary valve shaft 219. For example, as mentioned above, the rotary valve shaft 219 of one embodiment of a rotary valve may have a square cross-section. Accordingly, the inner surfaces 251b of the collet fingers 251 would have flat surfaces such as those depicted in FIGS. 2 and 3. The flat inner surfaces 251b of the collet fingers 251 are therefore adapted to engage the rotary valve shaft 219, thereby coupling the rotary shaft 219 to the drive assembly 204. While FIG. 3 only depicts the plurality of collet fingers 251 as comprising two diametrically opposed collet fingers 251, the collet 256 may include any number of circumferentially spaced collet fingers 251 capable of operating as desired.

During assembly, with the cover plates 222, 224 removed from the housing 202, the lever subassembly 208 is attached to the diaphragm subassembly 206 via the lever yoke 217 and rod end-bearing 243, as discussed above. Subsequently, the first and second positioning devices 216, 218 are disposed adjacent the first and second end portions 280, 282 of the lever 214, respectively. In a preferred embodiment, the first and second positioning devices 216, 218 include disk springs, and therefore the first and second positioning devices 216, 218 are disposed onto the first and second end portions 280, 282, respectively, of the lever 214.

Once the positioning devices 216, 218 are located relative to the lever 214, the first and second cover plates 222, 224 are fixed to the body 220 with the plurality of threaded fasteners 226 such that the first end portion 280 of the lever 214 is rotatably supported in the bore 222b of the first cover plate 222 and the second end portion 282 of the lever 214 is rotatably supported in the bore 224b in the second cover plate 224. At this point, the collet 256 would be disposed within the lever 214 such that portions of the collet fingers 251 extend axially outside of the second end portion 282 of the lever 214. So configured, the collet fingers 251 would be spread apart such that a dimension between the inner surfaces 251b thereof would be greater that a cross-sectional dimension of the rotary valve shaft 219. The actuator 200 would then be prepared to be coupled to the valve shaft 219. It should be appreciated by one of ordinary skill in the art that the positioning devices 216, 218 provide a "centering action" on the lever 214, such that during assembly, a predetermined compliance in the lever position results. That is, by providing positional compliance to the lever 214 during tightening, a slight deflection or translation can occur during engagement of the collet 224 and the valve shaft 219. The slight translation, which is proportional to the tolerance between the axial end surfaces 284a, 286a of the lever 214 and the inner surfaces 222a, 224a of the end plates, respectively, substantially prevents the lever 214 from being drawn tight or immediately adjacent to either inner surfaces 222a, 224a, which may substantially reduce the tension imparted to the valve shaft 219 during tightening.

Once the actuator 200 is assembled, the valve shaft 219 is disposed between the collet fingers 251. Next, the draw nut 258 is tightened on the threaded portion 253 of the collet 256. This causes the collet 256 to slidably displace within the bore 288 in the lever 214 toward the left relative to the orientation of the actuator 200 depicted in FIGS. 2 and 3. Simultaneously, sliding engagement between the second receiver portion 294 of the bore 288 and the outer surfaces 251a of the collet fingers 251 causes the collet fingers 251 to displace radially inward. Thus, as the draw nut 258 is further tightened, the inner surfaces 251b of the collet fingers 251 radially and frictionally engage the valve shaft 219. The collet fingers 251 are effectively wedged between the second receiver portion 294 and the rotary valve shaft 219, thereby coupling the valve shaft 219 to the drive assembly 204.

As mentioned, the tightening of the draw nut 258 draws the collet 256 through the lever 214. As the collet fingers 251 begin to slidably engage the second receiver portion 294, friction generated therebetween applies a load to the lever 214 which can displace the lever 214 within the housing 202. Particularly, the lever 214 will be displaced in a direction toward the valve shaft or toward the right as depicted in FIGS. 2 and 3. This causes the second axial end surface 286a of the second collar portion 286 of the lever 214 to axially engage the second positioning device 218.

In response, the second positioning device 218 resiliently deforms. Upon cessation of tightening the draw nut 258, the second positioning device 218 deflects back to its natural state, which is depicted in FIGS. 2 and 3. Upon deflecting back to its natural state, the second positioning device 218 engages the second axial end surface 286a of the second collar portion 286 of the lever 214 and displaces the lever 214 back to the predetermined position within the housing 202.

In the embodiment depicted herein, the predetermined position comprises a substantially centered position within the housing 202. Under certain conditions, the second positioning device 218 may displace the lever 214 beyond the centered position. Accordingly, as stated above, the actuator 200 disclosed herein is equipped with the first positioning device 216. The first positioning device 216 is generally identical to the second positioning device 218, but located adjacent the first end portion 280 of the lever 214. Therefore, the first positioning device 216 resiliently deflects in a manner just described with respect to the second positioning device 218, but to bias the lever 214 to the right relative to the orientation of the actuator 200 toward the center of the housing 202. Thus, the first and second positioning devices 216, 218 of the disclosed embodiment desirably counteract any axial displacement of the lever 214 to appropriately position the same within the housing 202.

While the actuator 200 has just been described as including a first positioning device 216 and a second positioning device 218 working in cooperation to locate the lever 214, an alternative embodiment may only include one of the first and second positioning devices 216, 218. Furthermore, it should be appreciated that the lever 214 has been described herein as including a first receiver portion 292 and a second receiver portion 294 disposed on opposite ends of the lever 214. However, thus far, the description has only disclosed the second receiver portion 294 serving a specified purpose. It should be appreciated that the actuator 200 disclosed herein is reversible. For example, the orientation of the collet 256 within the lever 214 may be reversed such that the actuator 200 may be adapted to be coupled to a valve shaft of a rotary valve on the left side relative to the orientation of the actuator in FIG. 2. As such, the first receiver portion 292 of the lever 214 would interact with the collet fingers 251 to couple the drive assembly 204 to a valve shaft in a manner identical to that described above with respect to the second receiver portion 294. In doing so, the first positioning device 216 serves to counteract any displacement of the lever 214 toward the valve shaft or to the left relative to the orientation of the actuator depicted in FIGS. 2 and 3. Thus, when the collet 256 is reversed, the first positioning device 216 operates in a manner identical to that described above with respect to the second positioning device 218. It should therefore be appreciated that the pair of positioning devices 216, 218 ensure that the lever 124 is desirably positioned for operation when attached to a valve shaft on either the left or right side of the actuator, thereby providing a positioning device assembly 215 adapted to position the lever 214 in a reversible actuator 200.

Figure 4A:
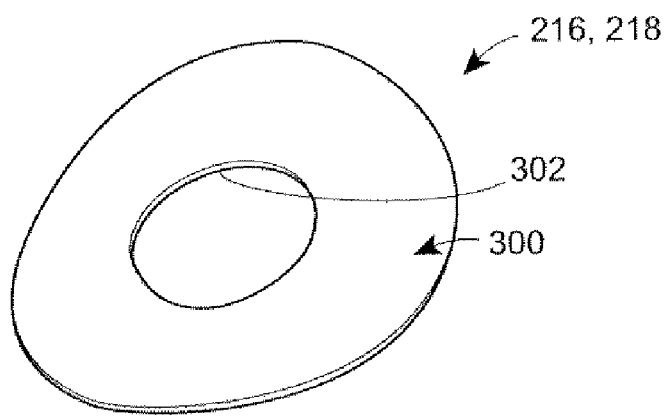
FIGS. 4A-4C are perspective, plan, and cross-sectional side views, respectively of a positioning device for incorporation within one embodiment of a rotary valve actuator constructed according to the principles of the present disclosure.
Figure 4B:
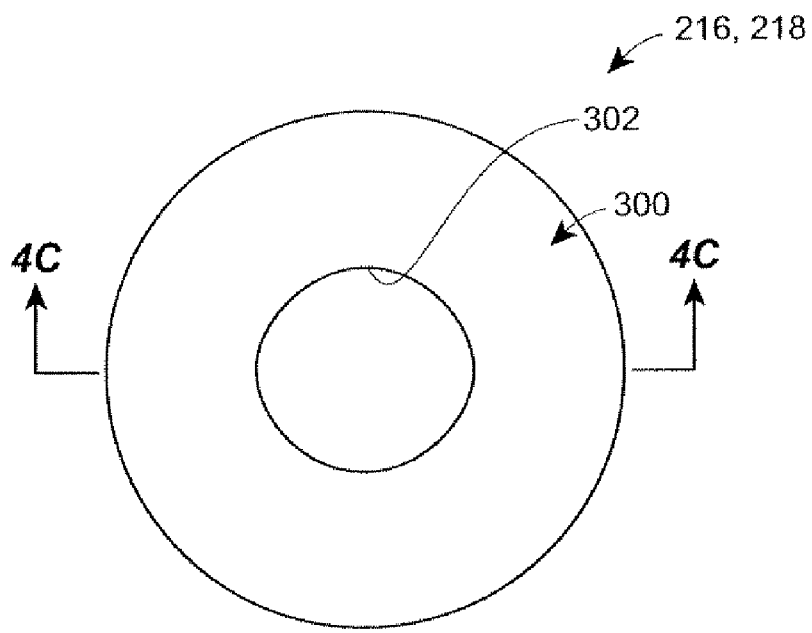
Figure 4C:
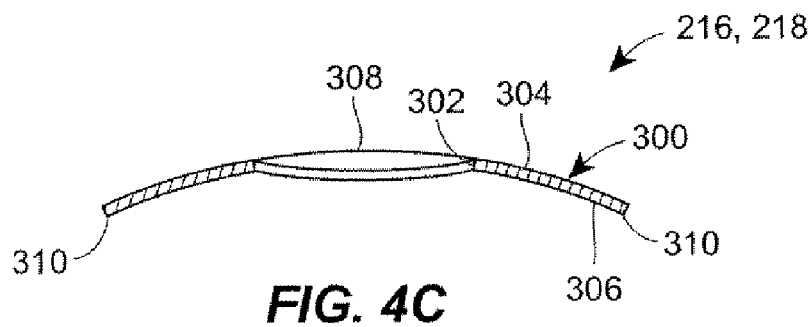

FIGS. 4A-4C depict one of the first and second positioning devices 216, 218 incorporated into the embodiment the actuator 200 described above with reference to FIGS. 2 and 3. The positioning device 216, 218 generally includes a curved metal spring washer 300 having a central aperture 302 adapted to be disposed adjacent one of the first end portion 280 or the second end portion 282 of the lever 214. As depicted in FIG. 4C, the curved spring washer 300 is curved into an arch and includes a top surface 304 and a bottom surface 306. The top surface 304 includes an apex 308. The bottom surface 306 includes opposing base edges 310.

Referring back to FIGS. 2 and 3, the second positioning device 218, which includes the curved spring washer 300, is disposed on the second end portion 282 of the lever 214 such that the top surface 304 engages the second axial end surface 286a of the second collar portion 286 of the lever 214. Accordingly, the opposing base edges 310 on the bottom surface 306 engage the inner surface 224a of the second cover plate 224. This ensures that the configuration of the curved spring washer 300 does not interfere with the rotational displacement of the lever 214 on the bushings 280 disposed in the bore 224b in the second cover plate 224.

Therefore, as the collet 256 is drawn by tightening of the draw nut 258, the lever 214 displaces along axis 260 and into engagement with the curved spring washer 300 during attachment to a rotary valve, as described above. Thus, the curved spring washer 300 deflects such that the opposing base edges 310 slightly spread apart. This causes the entire curved spring washer 300 to slightly flatten. As the lever 214 is drawn into engagement, the curved spring washer 300 resiliently returns to its original form and forces the lever 214 toward the center of the housing 202.

Figure 5A:
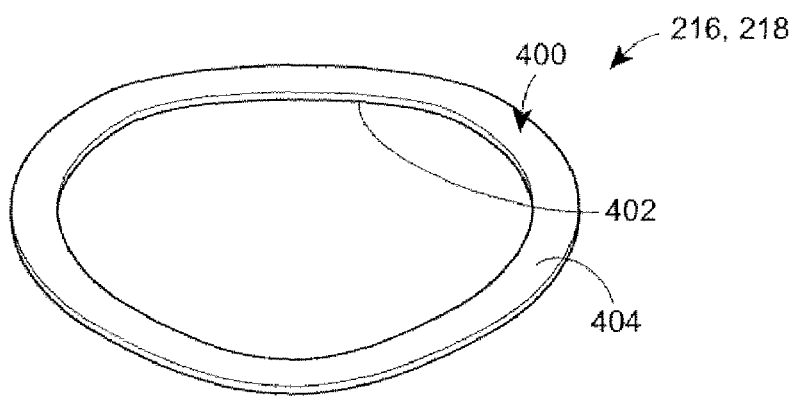
FIGS. 5A-5C are perspective, plan, and side views, respectively, of a positioning device for incorporation within another embodiment of a rotary valve actuator constructed according to the principles of the present disclosure.
Figure 5B:
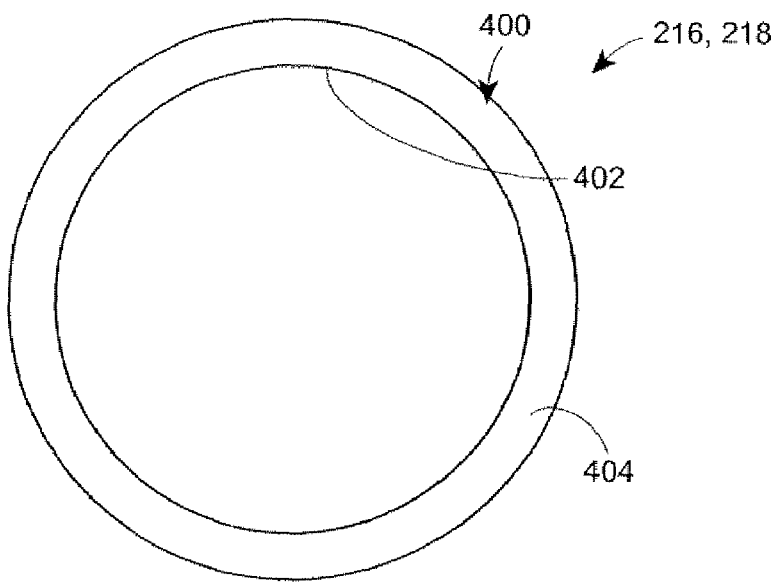
Figure 5C:
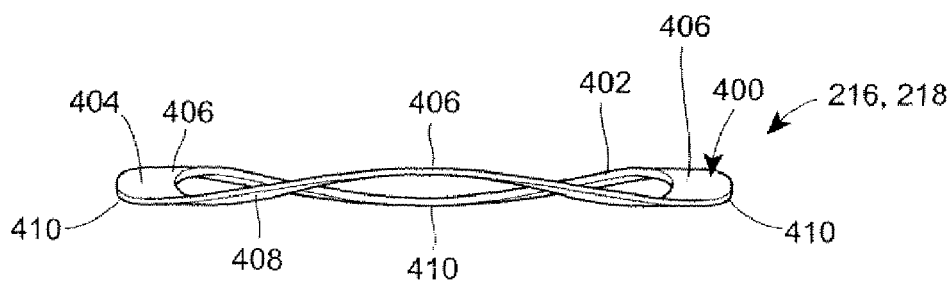

FIGS. 5A-5C depict an alternative positioning device that may be incorporated into an alternative embodiment of the actuator 200. The positioning device 216, 218 depicted in FIGS. 5A-5C includes a metal wave spring 400. The wave spring 400 is similar to the curved spring washer 300 described immediately above in that it includes an aperture 402 adapted to be disposed adjacent one of the first and second end portions 280, 282 of the lever 214. The wave spring 400 is configured such that it includes a top surface 404 having a plurality of apexes 406 and a bottom surface 408 with a plurality of apexes 410. Accordingly tie wave spring 400 may be oriented adjacent the first end portion 280 or second end portion 282 of the lever 214 with either the top surface 404 or the bottom surface 408 engaging the axial end surface 284a, 286a of the respective collar portion 284, 286. The wave spring 400 is effectively reversible, therefore eliminating any need to address the proper orientation thereof during the assembly process.

Similar to that described above with respect to the curved spring 300, as the wave spring 400 undergoes an application of force by the lever 214 during attachment to a rotary valve, the wave spring 400 deflects and slightly flattens out. As the force decreases, the wave spring 4 resiliently returns to its original form and forces the lever 214 toward the center of the housing 202.

Figure 6A:
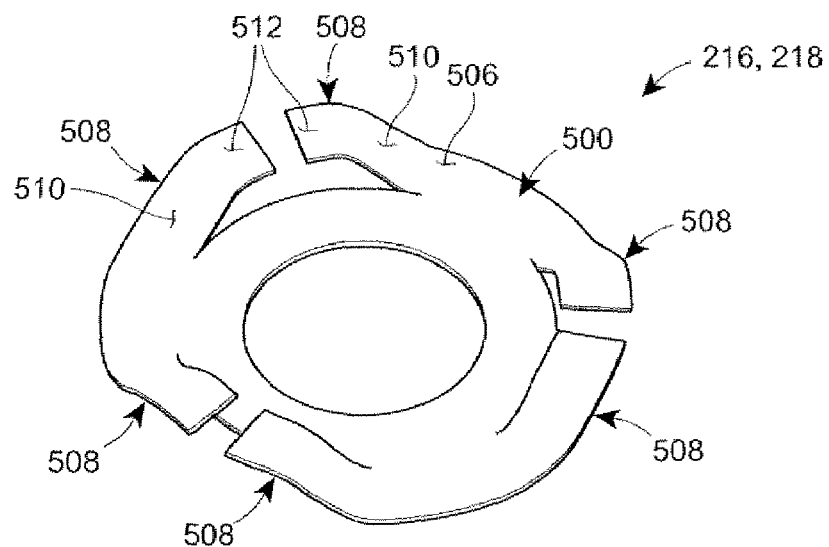
FIGS. 6A-6C are perspective, plan, and side views, respectively, of a positioning device for incorporation within yet another embodiment of a rotary valve actuator constructed according to the principles of the present disclosure.
Figure 6B:
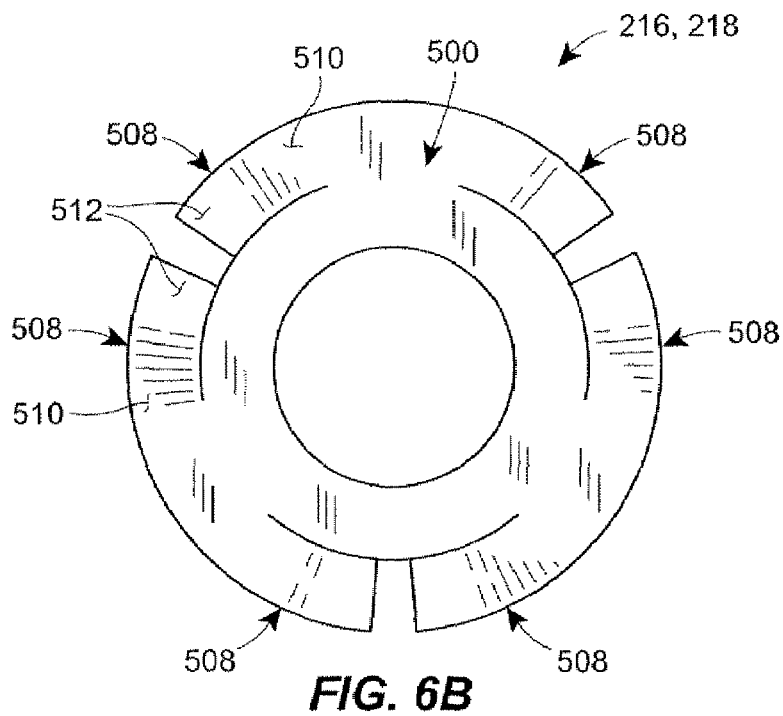
Figure 6C:
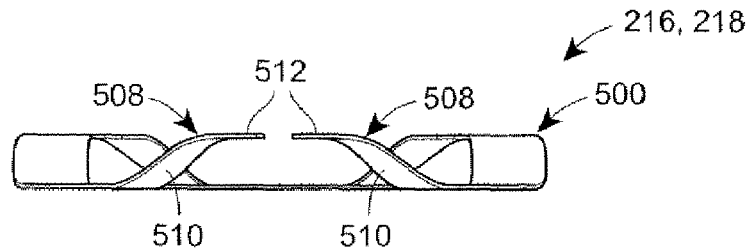

FIGS. 6A-6C depict yet another alternative positioning device 216, 218 that may be incorporated into yet another alternative embodiment of the actuator 200. The positioning device 216, 218 depicted in FIGS. 6A-6C includes a metal finger disk spring 500. The finger disk spring 500 is similar to the curved spring washer 300 and the wave spring 400 described above in that it includes an aperture 502 adapted to be disposed adjacent one of the first and second end portions 280, 282 of the lever 214. However, the finger disk spring 500 also includes an inner disk portion 504 and an outer disk portion 506. The inner disk portion 504 is a generally continuous flat disk. The outer disk portion 506 includes a plurality of finger springs 508. Each finger spring 508 is cantilevered from the outer disk portion 506 and includes an inclined portion 510 and a flat portion 512, as depicted in FIGS. 6A and 6C.

Similar to the curved spring washer 300 described above with reference to FIGS. 4A-4C, the finger disk spring 500 should be properly oriented when disposed adjacent the lever 214. For example, with reference to FIG. 2 and FIGS. 6A-6C, the finger disk spring 500 should be oriented adjacent one of the first and second end portions 280, 282 of the lever 214 such that the inner disk portion 504 engages the axial end surface 284a, 286a of the respective collar portion 284, 286 of the lever 214. Accordingly, the flat portions 512 of the finger springs 508 engage the inner surfaces 222a, 224a of the respective cover plates 222, 224. This ensures that the configuration of the finger disk spring 500 does not interfere with the rotational displacement of the lever 214 on the bushings 296 disposed in the bores 222b, 224b of the cover plates 222, 224.

Therefore, as the lever 214 engages the finger disk spring 500 during attachment to a rotary valve, as described above, the finger springs 508 and, more particularly the inclined portions 510 of the finger springs 508 detect and the flat portions 512 of the finger springs 508 slide on the inner surfaces 222a, 224a of the respective cover plates 222, 224. Accordingly, the entire finger disk spring 500 slightly flattens. As the force decreases, the finger springs 508 resiliently return to their original form and force the lever 214 toward the center of the housing 202.

It should be understood that in one embodiment of the actuator 200, the load applied to the lever 214 by drawing the collet 256 through the bore 288 is a relatively small load and the deflection of the respective positioning device 216, 218 in response to the load may generally be on the order of between approximately 0.05 inches and 0.15 inches. In a preferred embodiment, for example, the positioning devices 216, 218 such as the curved spring washer 300, the wave spring 400, or the finger disk spring 500 are adapted to deflect on the order of approximately 0.10 inches. However, in alternative embodiments, it should be appreciated that the positioning devices 216, 218 may be adapted to deflect any amount operable to serve the principles of the present disclosure, As mentioned, the positioning devices 216, 218 described herein generally comprise metal spring devices, for example, the curved spring washer 300, the wave spring 400, or the finger disk spring 500. In one embodiment, however, the positioning devices 216, 218 may comprise any other type of resilient or non-resilient member capable of counteracting the forces generated by drawing the collet 256 through the lever 214. For example, in one alternative embodiment, the positioning devices 216, 218 may comprise rubber springs or grommets, coil springs, lever springs, or any other foreseeable device.

Furthermore, while the positioning devices 216, 218 have been described herein as being positioned adjacent at least one of the first and second end portions 280, 282 of the lever 214, alternative embodiments of the actuator 200 may include the positioning devices 216, 218 disposed within cavities formed in the lever 214 and/or the cover plates 222, 224 of the housing 202. Additionally, although the first positioning device 216 has been disclosed as being generally identical to the second positioning device 218, alternative embodiments of the actuator 200 may include first and second positioning devices 216, 218 that are different from each other. For example, in one alternative embodiment, the first positioning device 216 may include a spring coefficient that is greater than or less than a spring coefficient that the second positioning device 218; or the first and second positioning devices 216, 218 may be constructed of different materials for achieving different objectives. Further yet, while the positioning devices 216, 218 have been disclosed herein as generally axially centering the lever 214 within the cavity 232 of the housing 202, another embodiment of the actuator 200 may comprise one or more positioning devices centering the lever 214 about its axis of rotation 260. For example, in alternative embodiment, one or more positioning device may be disposed between the lever 214 and the bore 222b, 224b of one of the cover plates 222, 224.

Further still, while the positioning devices 216, 218 have been described herein as being incorporated into a rotary valve actuator 200, the positioning devices 216, 218 are not limited to rotary valve actuators and may be implemented in linear drive actuators or any other type of actuator.

Therefore, in light of the foregoing it should be appreciated that the present disclosure provides a rotary valve actuator having a lever that is rotatable within a housing thereof. Specifically, the present disclosure provides an actuator including positioning devices that are operable to bias, force, or otherwise locate the lever in a predetermined position, thereby ensuring an appropriate relationship exists between the actuator and the rotary valve and, particularly, the rotary valve shaft.

What is claimed:

1. A valve actuator for being coupled to a valve shaft, comprising:
   a housing;
   a lever disposed within the housing and adapted to be operatively coupled to rotate the valve shaft;
   a positioning device disposed between and engaging at least one axial end surface of the lever and the housing for biasing the lever into a predetermined position;
   a collet carried by the lever, the collet adapted to couple the lever to the valve shaft, wherein the collet applies a force to the lever in a first direction and the positioning device biases the lever in a second direction that is substantially opposite the first direction.

2. The valve actuator of claim 1, wherein the positioning device comprises at least one spring biasing the lever away from a portion of the housing.

3. The valve actuator of claim 1, wherein the lever comprises an elongated member having a first end rotatably supported by a first portion of the housing and a second end rotatably supported by a second portion of the housing.

4. The valve actuator of claim 3, wherein the positioning device comprises a first spring engaging a first axial end surface of the lever and a second spring engaging a second axial end surface of the lever, the first and second springs biasing the lever toward a center of a cavity in the housing.

5. The valve actuator of claim 1, wherein the positioning device comprises a curved disk spring.

6. The valve actuator of claim 1, wherein the positioning device comprises a wave spring.

7. The valve actuator of claim 1, wherein the positioning device comprises a finger disk spring.

8. A rotary valve actuator for being coupled to a valve shaft of a rotary valve, the actuator comprising:
    a housing;
    a lever disposed within the housing and adapted to be operatively coupled to the valve shaft;
    a positioning device assembly disposed between and engaging at least one axial end surface of the lever and the housing to bias the lever into a predetermined position within the housing;
    a collet carried by the lever, the collet adapted to couple the lever to the valve shaft, wherein the collet applies a force to the lever in a first direction and the positioning device biases the lever in a second direction that is substantially opposite the first direction.

9. The rotary valve actuator of claim 8, wherein the positioning device assembly comprises a biasing member.

10. The rotary valve actuator of claim 8, wherein the positioning device assembly comprises at least one spring biasing the lever away from a portion of the housing.

11. The rotary valve actuator of claim 8, wherein the lever comprises an elongated member having a first end rotatably supported by a first portion of the housing and a second end rotatably supported by a second portion of the housing.

12. The rotary valve actuator of claim 11, wherein the positioning device assembly comprises a first spring engaging a first axial end surface of the lever and a second spring engaging a second axial end surface of the lever, the first and second springs biasing the lever toward a center of the housing.

13. The rotary valve actuator of claim 8, wherein the positioning device assembly comprises a curved disk spring.

14. The rotary valve actuator of claim 8, wherein the positioning device assembly comprises a wave spring.

15. The rotary valve actuator of claim 8, wherein the positioning device assembly comprises a finger disk spring.

16. A device for coupling an actuator to a valve shaft of a rotary valve, the device comprising:
    a housing arranged for connection to the rotary valve adjacent the rotary valve shaft;
    a lever rotatably disposed within the housing and adapted to be operatively coupled to the valve shaft;
    a first spring disposed between and engaging a first axial end surface of the lever and the housing to bias the lever in a first direction;
    a second spring disposed between and engaging a second axial end surface of the lever and the housing to bias the lever in a second direction such that the first and second springs center the lever in the housing;
    a collet carried by the lever, the collet adapted to couple the lever to the valve shaft, wherein the collet applies a force to the lever in a second direction, wherein the second direction is substantially opposite the first direction.

17. The device of claim 16, wherein lever is a generally elongated member comprising a first end rotatably supported by the housing and a second end rotatably supported by the housing.

18. The device of claim 16, wherein the first and second springs comprise curved disk springs.

19. The device of claim 16, wherein the first and second springs comprise wave springs.

20. The device of claim 16, wherein the first and second springs comprise finger disk springs.

\* \* \* \* \*

UNITED STATES PATENT AND TRADEMARK OFFICE
CERTIFICATE OF CORRECTION

| | | |
|---|---|---|
| PATENT NO. | : 7,712,723 B2 | Page 1 of 1 |
| APPLICATION NO. | : 11/468581 | |
| DATED | : May 11, 2010 | |
| INVENTOR(S) | : Olberding | |

It is certified that error appears in the above-identified patent and that said Letters Patent is hereby corrected as shown below:

On the Title Page:

At field (57), line 3, "shaft" should be -- shaft. --.

In the Specification:

At Column 2, line 11, "housings" should be -- housing, --.

At Column 3, line 1, "housings" should be -- housing --.

At Column 3, line 15, "tie" should be -- the --.

At Column 5, line 45, "then" should be -- than --.

Signed and Sealed this
Nineteenth Day of April, 2011

David J. Kappos
*Director of the United States Patent and Trademark Office*